(12) United States Patent
Chen et al.

(10) Patent No.: US 11,632,837 B2
(45) Date of Patent: Apr. 18, 2023

(54) LIGHT EMITTING DIODE ILLUMINATING SYSTEM

(71) Applicant: XIAMEN LEEDARSON LIGHTING CO., LTD, Fujian (CN)

(72) Inventors: Biao Chen, Fujian (CN); Shuxing Gao, Fujian (CN)

(73) Assignee: XIAMEN LEEDARSON LIGHTING CO., LTD, Fujian (CN)

( * ) Notice: Subject to any disclaimer, the term of this patent is extended or adjusted under 35 U.S.C. 154(b) by 52 days.

(21) Appl. No.: 17/409,503

(22) Filed: Aug. 23, 2021

(65) Prior Publication Data

US 2022/0210885 A1    Jun. 30, 2022

(30) Foreign Application Priority Data

Dec. 30, 2020   (CN) .......................... 202023329509.0

(51) Int. Cl.
*H05B 45/24*   (2020.01)
*H05B 45/10*   (2020.01)
*H05B 45/44*   (2020.01)

(52) U.S. Cl.
CPC ............. *H05B 45/24* (2020.01); *H05B 45/44* (2020.01)

(58) Field of Classification Search
None
See application file for complete search history.

(56) References Cited

U.S. PATENT DOCUMENTS

2020/0146116 A1*  5/2020  Janik ..................... H05B 45/20

* cited by examiner

*Primary Examiner* — Dedei K Hammond
(74) *Attorney, Agent, or Firm* — Chun-Ming Shih; Lanway IPR Services

(57) ABSTRACT

A LED illumination system includes a signal inputting module, a driving module, a switch module, an illumination module, a sampling module, and a control module. The signal inputting module receives a selection signal that corresponds to one specific color temperature and generates a first voltage signal based on the selection signal. The driving module generates a driving signal based on a color temperature adjusting signal. The switch module includes a plurality of LED control units whose activation status that the illumination module responds to illuminate. The sampling module samples the output current of the switch module and generates a second voltage signal correspondingly. The control module receives the first voltage signal and the second voltage signal and generates a control signal correspondingly. And the control module relays the control signal. The switch module additionally controls its illumination status based on the driving signal and the control signal.

20 Claims, 3 Drawing Sheets

LIGHT EMITTING DIODE ILLUMINATING SYSTEM

FIELD

The present invention relates to a light emitting diode (LED) illuminating system, and more particularly, to a LED illuminating system capable of dynamically adjusting its luminance and/or its color temperature.

BACKGROUND

LEDs has high illumination efficiency and a long life-cycle. Such that LED is popularly used for the public. However, a LED's color temperature is fixed, i.e., its color temperature cannot be dynamically adjusted. Therefore, for enabling LEDs to illuminate in various luminance and/or color temperatures under a variety of conditions/requirements, LEDs are required to be adjusted in real-time.

Most conventional silicon dimmer circuit can only switch on or off LEDs without delicate luminance adjustment. Also, such conventional silicon dimmer circuit's design is highly complicated and therefore expensive. Such that the conventional silicon dimmer circuit cannot be applied on various LED illuminating systems.

SUMMARY

The present disclosure aims at disclosing a light emitting diode (LED) illumination system that includes a signal inputting module, a driving module, a switch module, an illumination module, a sampling module, and a control module. The signal inputting module receives a selection signal that corresponds to one specific color temperature. Also, the signal inputting module generates a first voltage signal based on the selection signal. The driving module generates a driving signal based on a color temperature adjusting signal. The switch module is electrically coupled to the driving module for receiving the driving signal. Moreover, the switch module includes a plurality of LED control units that are electrically coupled to each other in parallel. The illumination module is electrically coupled to the plurality of LED control units of the switch module. On top of that, the illumination module illuminates in response to an activation status of the plurality of LED control units. The sampling module is electrically coupled to the driving module and electrically coupled to the switch module for sampling the output current of the switch module. And the sampling module generates a second voltage signal based on the sampled output current. The control module is electrically coupled to the signal inputting module for receiving the first voltage signal and electrically coupled to the sampling module for receiving the second voltage signal. Besides, the control module generates a control signal based on the first voltage signal and the second voltage signal. And the control module is electrically coupled to the switch module for relaying the control signal. The switch module additionally controls its illumination status based on the driving signal and the control signal.

In one example, the signal inputting module includes a multiplexing switch and a plurality of resistors. And the plurality of resistors are respectively electrically coupled to the multiplexing switch. Also, the multiplexing switch conducts one of the plurality of resistors based on the color temperature selection signal for generating the first voltage signal.

In one example, each of the plurality of LED control units includes a transistor, a first resistor and a second resistor. The transistor has a first terminal electrically coupled to a corresponding control terminal of the control module for receiving the control signal. In addition, the transistor has a second terminal electrically coupled to the driving module for receiving the driving signal. And the transistor has a third terminal electrically coupled to a control terminal of the illumination module for controlling the illumination of the illumination module. The first resistor has a first terminal electrically coupled to the first terminal of the transistor. Moreover, the first resistor has a second terminal electrically coupled to the second terminal of the transistor. The second resistor has a first terminal electrically coupled to the first terminal of the transistor. Besides, the second resistor has a second terminal electrically coupled to a LED driving terminal of the illumination module for driving the illumination module.

In one example, the transistor may be one of a p-type metal-oxide semiconductor field effect transistor (MOSFET), an N-type MOSFET, an npn bipolar junction transistor (BJT), and a pnp BJT.

In one example, the sampling module includes an operational amplifier that has a negative input terminal electrically coupled to ground. The operational amplifier also has a positive input terminal electrically coupled to the driving module. In addition, the operational amplifier has an output terminal electrically coupled to the control module and the negative terminal of the operational amplifier.

In one example, the sampling module further includes a resistor that is electrically coupled between the output terminal of the operational amplifier and the negative input terminal of the operational amplifier.

In one example, the sampling module further includes a resistor that has a first terminal electrically coupled to the negative input terminal and having a second terminal electrically coupled to ground.

In one example, the sampling module further includes a resistor that has a first terminal electrically coupled to the positive input terminal of the operational amplifier. Besides, the resistor has a second terminal electrically coupled to the driving module.

In one example, the sampling module further includes a resistor that has a first terminal electrically coupled to the driving module and having a second terminal electrically coupled to the switch module.

In one example, the sampling module further includes a resistor that has a first terminal electrically coupled to the output terminal of the operational operator. Moreover, the resistor has a second terminal electrically coupled to the control module.

In one example, the control module includes a microprocessor unit that has a first input terminal electrically coupled to the signal inputting module for receiving the first voltage signal. And the microprocessor unit has a second input terminal electrically coupled to the sampling module for receiving the second voltage signal. Additionally, the microprocessor unit has a plurality of control terminals electrically and respectively coupled to the plurality of LED control units for relaying the control signal.

In one example, the control module further includes a Zenar diode, an electrolytic capacitor, a capacitor, and a resistor. The Zenar diode has a first terminal electrically coupled to a power terminal of the microprocessor unit. Second, the Zenar diode has a second terminal electrically coupled to a power source. Third, the Zenar diode has a third terminal electrically coupled to ground. The electrolytic capacitor has a first terminal electrically coupled between the first terminal and the second terminal of the Zenar diode. The capacitor is electrically coupled between the first terminal and the third terminal of the Zenar diode. The resistor has a first terminal electrically coupled to the third terminal of the Zenar diode. Also, the resistor has a second terminal electrically coupled to the power source.

In one example, the control module further includes a capacitor that is electrically coupled between a power terminal of the microprocessor unit and a ground terminal of the microprocessor unit.

In one example, the control module further includes a resistor, a first capacitor and a second capacitor. The resistor has a first terminal electrically coupled to a power terminal of the microprocessor unit. Besides, the resistor has a second terminal electrically coupled to the signal inputting module. The first capacitor has a first terminal electrically coupled to the second terminal of the resistor. Also, the first capacitor has a second terminal electrically coupled to ground. The second capacitor has a first terminal electrically coupled to ground. In addition, the second capacitor has a second terminal electrically coupled to the microprocessor unit and the sampling module.

In one example, the driving module includes a rectifying filter unit, a controllable silicon driving unit and a strobe removing unit. The rectifying filter unit receives power from an external power source and rectifies the received power. The controllable silicon driving unit is electrically coupled to the rectifying filter unit for receiving the rectified power. Also, the controllable silicon driving unit generates a pre-filtered driving signal based on the color temperature adjusting signal. The strobe removing unit is electrically coupled to the controllable silicon driving unit, the switch module, and the sampling module. Besides, the strobe removing unit filters the pre-filtered driving signal to generate the driving signal. Moreover, the strobe removing unit drives the switch module using the driving signal.

In one example, the rectifying filter unit includes a rectifying bridge, a filter inductor, and a first capacitor. The rectifying bridge has a first side electrically coupled to the external power source. Moreover, the rectifying bridge has a second side for relaying the rectified power. The filter inductor has a first terminal electrically coupled to the second side of the rectifying bridge. On top of that, the filter inductor has a second terminal electrically coupled to the controllable silicon driving unit. The first capacitor has a first terminal electrically coupled to the second terminal of the filter inductor. Besides, the first capacitor has a second terminal electrically coupled to a ground terminal of the rectifying bridge and to ground. The first resistor is electrically coupled to the filter inductor in parallel. The second capacitor has a first terminal electrically coupled to the first terminal of the filter inductor. And the second capacitor has a second terminal electrically coupled to the second terminal of the first capacitor. The third capacitor has a first terminal electrically coupled to the second terminal of the filter inductor. The second resistor has a first terminal electrically coupled to a second terminal of the third capacitor. Besides, the second resistor has a second terminal electrically coupled to the second terminal of the first capacitor.

In one example, the rectifying filter unit includes a surge suppressor that is electrically coupled between the external power source and the rectifying bridge.

In one example, the controllable silicon driving unit includes a controllable silicon driving chip that has a power terminal electrically coupled to the illumination module. Second, the controllable silicon driving chip has a resistor setting terminal electrically coupled to ground. Third, the controllable silicon driving chip has a current compensation terminal electrically coupled to ground. Fourth, the controllable silicon driving chip has a voltage feedback terminal electrically coupled to the rectifying filter unit and the strobe removing unit. Fifth, the controllable silicon driving chip has a current sensing terminal electrically coupled to ground. Sixth, the controllable silicon driving chip has an output terminal electrically coupled to the strobe removing unit. And the controllable silicon driving chip has a ground terminal electrically coupled to ground.

In one example, the controllable silicon driving unit further includes a first resistor, a first capacitor, a second resistor, a second capacitor, a third resistor and a first diode. The first resistor is electrically coupled between the power terminal of the controllable silicon driving chip and the illumination module. The first capacitor is electrically coupled between the power terminal of the controllable silicon driving chip and ground. The second resistor is electrically coupled between the resistor setting terminal of the controllable silicon driving chip and ground. The second capacitor is electrically coupled between the current compensation terminal of the controllable silicon driving chip and ground. The third resistor has a first terminal electrically coupled to the voltage feedback terminal of the controllable silicon driving chip. Besides, the third resistor has a second terminal electrically coupled to the strobe removing unit. The first diode has a positive terminal electrically coupled to the output terminal of the controllable silicon driving chip. In addition, the first diode has a negative terminal electrically coupled to the second terminal of the third resistor.

In one example, the controllable silicon driving unit further includes a transformer secondary winding, a second diode, a third capacitor, a Zenar diode and a fourth capacitor. The transformer secondary winding has a first terminal electrically coupled to the rectifying filter unit and the strobe removing unit. Also, the transformer secondary winding has a second terminal electrically coupled to the output terminal of the controllable silicon driving unit. The second diode has a positive terminal electrically coupled to a third terminal of the transformer secondary winding. Besides, the second diode has a negative terminal electrically coupled to a secondary power source. The third capacitor has a first terminal electrically coupled to the negative terminal of the second diode. Moreover, the third capacitor has a second terminal electrically coupled to the rectifying filter unit and the strobe removing unit. The Zenar diode has a positive terminal electrically coupled to the second terminal of the third capacitor. And the Zenar diode has a negative terminal electrically coupled to the negative terminal of the first diode. The electrolytic capacitor is electrically coupled to the Zenar diode in parallel.

In one example, the strobe removing unit includes a transistor, a first resistor, a first Zenar diode, an electrolytic capacitor, a second Zenar diode, a diode and a second resistor. The transistor has a first terminal electrically coupled to the illumination module. The first resistor has a first terminal electrically coupled to a second terminal of the transistor. The first Zenar diode has a positive terminal electrically coupled to the first terminal of the transistor. Also, the first Zenar diode has a negative terminal electrically coupled to the second terminal of the transistor. The electrolytic capacitor has a first terminal electrically coupled to the controllable silicon driving unit and the switch module. In addition, the electrolytic capacitor has a second terminal electrically coupled to a second terminal of the first resistor. The second Zenar diode has a positive terminal electrically coupled to the second terminal of the first resistor. The diode has a positive terminal electrically coupled to a third terminal of the transistor and the controllable silicon driving unit. And the diode has a negative terminal electrically coupled to a negative terminal of the second Zenar diode. The second resistor is electrically coupled to the diode in parallel.

DETAILED DESCRIPTION

As mentioned above, the present disclosure discloses a LED illuminating system that can adjust its luminance and/or color temperature. Such that the disclosed LED illuminating system overcomes the conventional silicon dimmer circuit's defect in adjustments.

Figure 1:
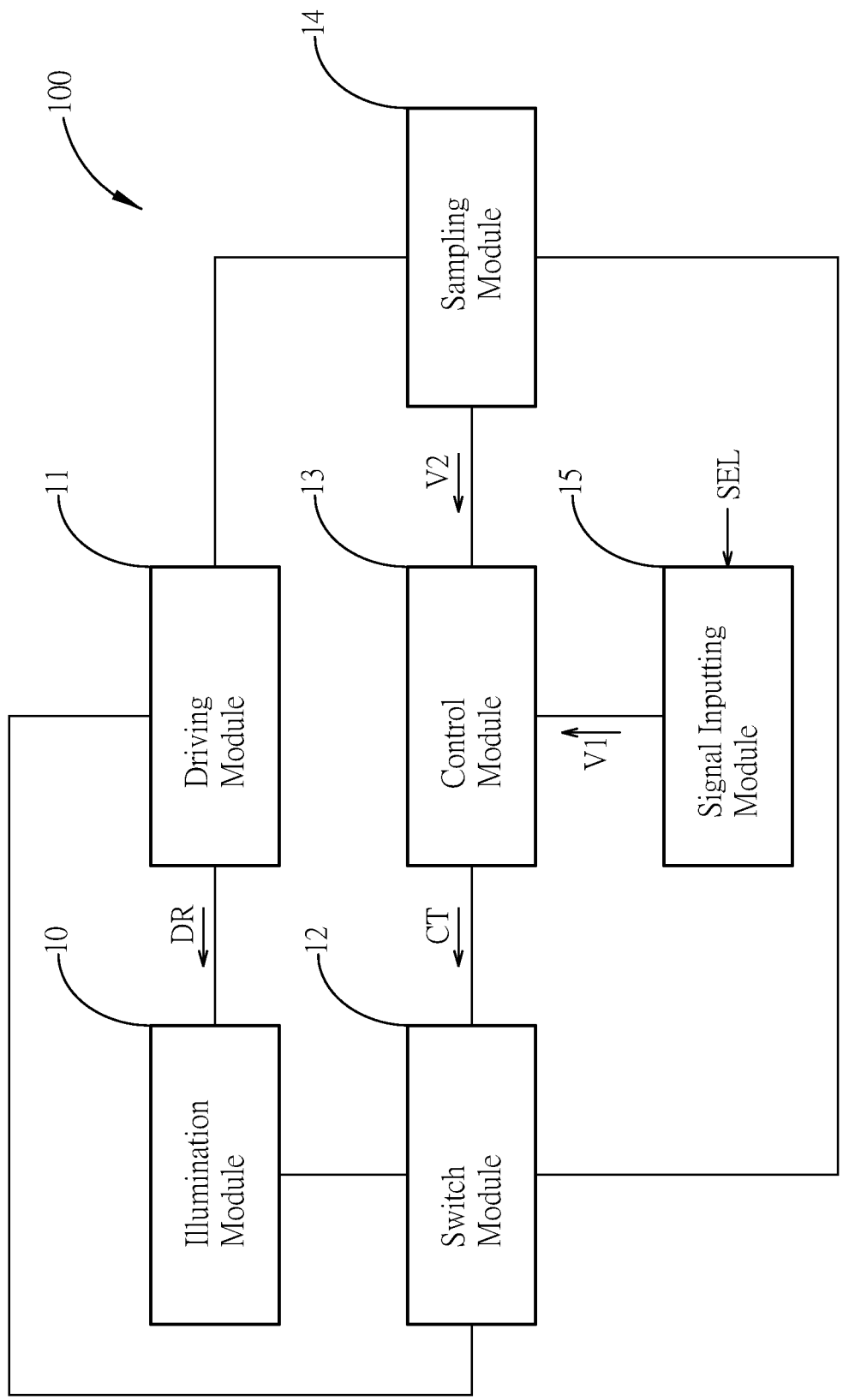
FIG. 1 illustrates a schematic diagram of a LED illuminating system according to one embodiment of the present disclosure.

FIG. 1 illustrates a schematic diagram of a LED illuminating system 100 according to one embodiment of the present disclosure. The LED illuminating system 100 includes a signal inputting module 15, a driving module 11, a switch module 12, an illumination module 10, a sampling module 14 and a control module 13.

The signal inputting module 15 receives a selection signal SEL that corresponds to one specific color temperature. In some examples, the selection signal SEL may be triggered via a manual command for instantly responding to a user's requirements. Also, the signal inputting module 15 generates a first voltage signal based on the selection signal SEL.

The driving module 11 generates a driving signal DR based on a color temperature adjusting signal CT.

Figure 3:
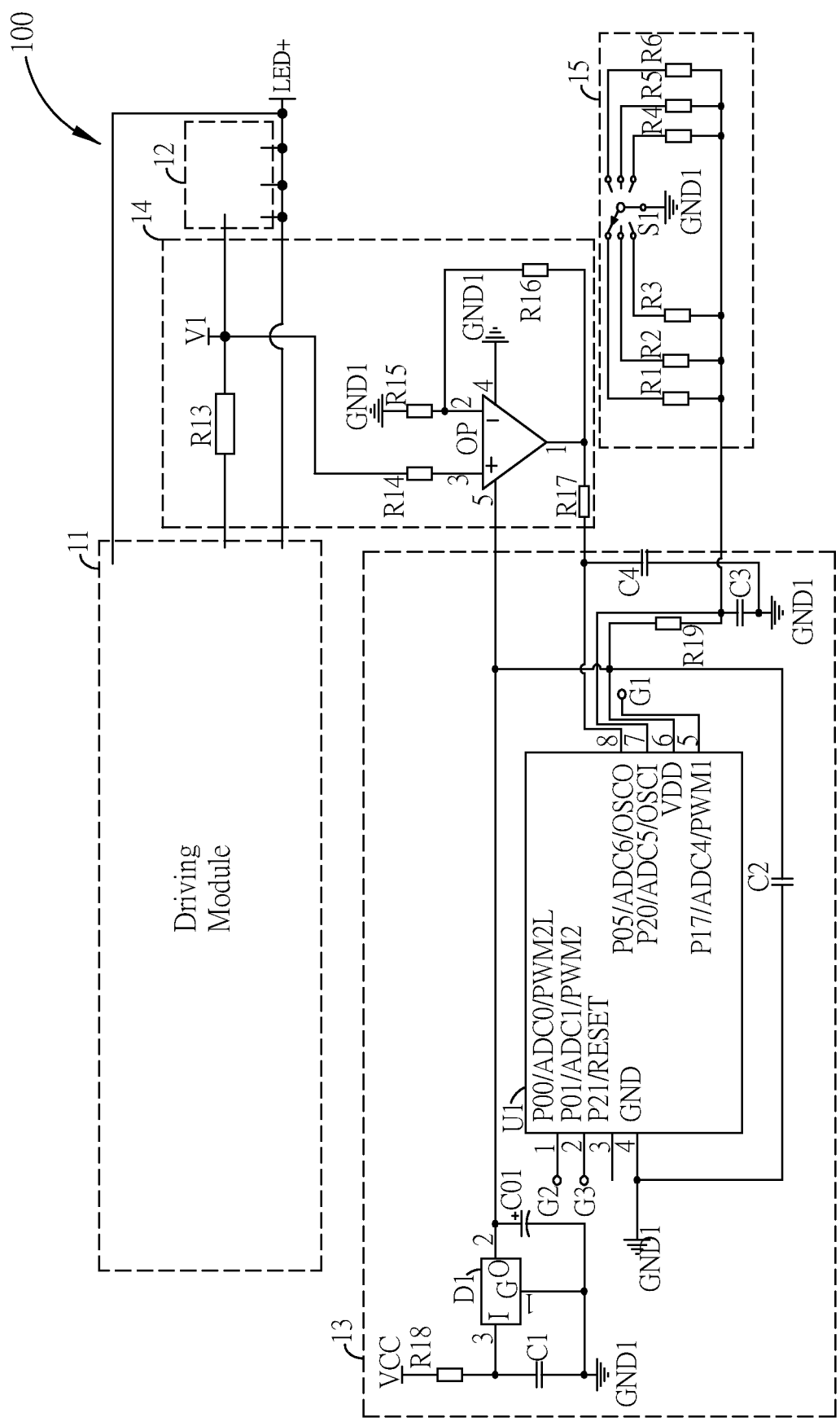

The switch module 12 is electrically coupled to the driving module 11 for receiving the driving signal DR. Moreover, the switch module 12 includes a plurality of LED control units (e.g., LED control units 121, 122, 123 or more, as shown in FIG. 3) that are electrically coupled to each other in parallel.

The illumination module 10 is electrically coupled to the plurality of LED control units of the switch module 12. On top of that, the illumination module 10 illuminates in response to an activation status of the plurality of LED control units. In some examples, the illumination module 10 includes multiple LEDs respectively corresponding to the plurality of LED control units, such that the switch module 12 can control the LEDs' respective luminance (e.g., on or off) and/or a total color temperature that is represented by the LEDs.

The sampling module 14 is electrically coupled to the driving module 11 and electrically coupled to the switch module 12 for sampling the output current of the switch module 12. And the sampling module 14 generates a second voltage signal V2 based on the sampled output current.

The control module 13 is electrically coupled to the signal inputting module 14 for receiving the first voltage signal V1 and electrically coupled to the sampling module 14 for receiving the second voltage signal V2. Besides, the control module 13 generates a control signal CT based on the first voltage signal V1 and the second voltage signal V2. And the control module 13 is electrically coupled to the switch module 12 for relaying the control signal CT.

The switch module 12 additionally controls its illumination status based on the driving signal DR and the control signal CT for the purpose of dynamically adjusting the illumination module 10's luminance and/or color temperature.

Figure 2:
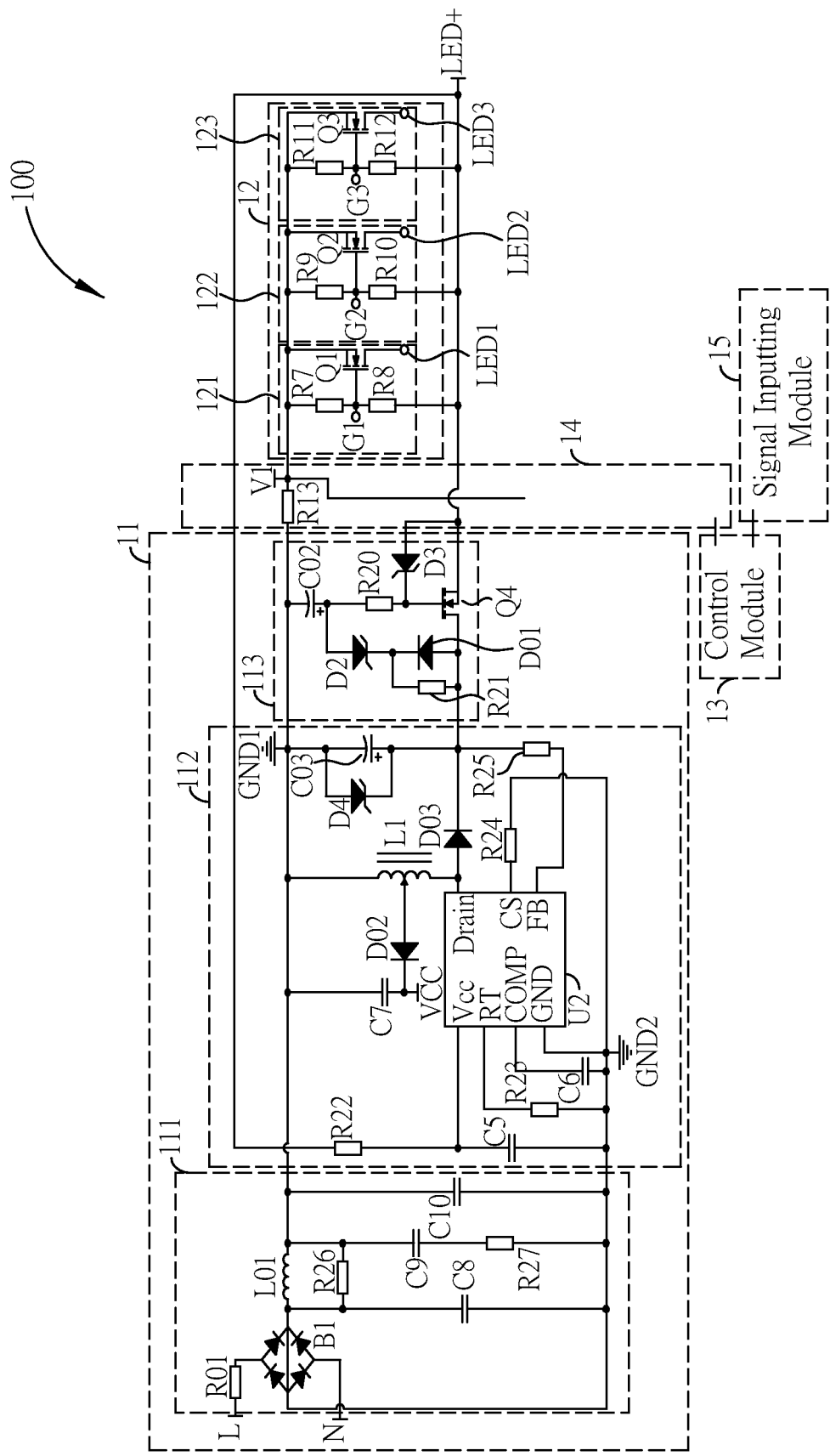
FIG. 2 and FIG. 3 illustrate the illuminating system shown in FIG. 1 in combination using schematic diagrams according to one example of the present disclosure.

FIG. 2 and FIG. 3 illustrate the illuminating system 100 shown in FIG. 1 in combination using schematic diagrams according to one example of the present disclosure.

In one example, the signal inputting module 15 includes a multiplexing switch S1 and a plurality of resistors, for examples, resistors R1, R2, R3, R4, R5 and R6, resistance of which can be adjusted for various requirements of luminance. And the plurality of resistors are respectively electrically coupled to the multiplexing switch S1. It is noted that the number of parallelly-coupled resistors is optional and can be determined in response to various user requirements for luminance and/or color temperatures. Also, the multiplexing switch S1 conducts one of the plurality of resistors (i.e., chooses one of the resistors) based on the color temperature selection signal SEL for generating the first voltage signal V1.

Take a combination of the resistors R1, R2, R3, R4, R5 and R6 as an example of the multiplexing switch S1. In one example, the resistors R1, R2, R3, R4, R5 and R6 respectively corresponds to color temperatures 27K, 30K, 35K, 40K, 50K and a combination mode. In this way, the signal inputting module 15 allows various selections of color temperatures. More specifically, in one example, the combination mode's functions include: when the selection signal SEL refers to a dimmer schedule of 90%-100%, the illumination module 10 is adjusted to activate a color temperature of 50K; when the selection signal SEL refers to a dimmer schedule of 84%-90%, the illumination module 10 is adjusted to activate a color temperature of 30K; and when the selection signal SEL refers to a dimmer schedule of 0%-84%, the illumination module 10 is adjusted to activate a gradual color temperature spectrum of 20%-30%.

In one example, within the switch module 12, each of the plurality of LED control units (e.g., the LED control units 121, 122 and 123 shown in FIG. 3) includes a transistor, a first resistor and a second resistor. It is noted that the number of LED control units in the switch module 12 can be adjusted in response to design requirements. In an exemplary fashion, the LED control unit 121 includes a transistor Q1, a first resistor R7 and a second resistor R8. The transistor Q1 has a first terminal electrically coupled to a corresponding control terminal of the control module 13 (e.g., the control terminal G1 shown in FIGS. 2-3) for receiving the control signal CT. In addition, the transistor Q1 has a second terminal electrically coupled to the driving module 11 for receiving the driving signal DR. And the transistor Q1 has a third terminal electrically coupled to a control terminal LED1 of the illumination module 10 (e.g., the control terminal G1 of a microprocessor unit U1 shown in FIG. 2) for controlling the illumination of the illumination module 10 via the control terminal LED1. The first resistor R7 has a first terminal electrically coupled to the first terminal of the transistor Q1 (e.g., a source of the transistor Q1 that is exemplarily implemented using a p-type MOSFET). Moreover, the first resistor R7 has a second terminal electrically coupled to the second terminal of the transistor Q1 (e.g., a gate of the transistor Q1 that is exemplarily implemented using a p-type MOSFET). The second resistor R8 has a first terminal electrically coupled to the first terminal of the transistor Q1. Besides, the second resistor R8 has a second terminal electrically coupled to a LED driving terminal of the illumination module 10 for driving the illumination module 10. On top of that, the transistor Q1 has a third terminal electrically coupled to a corresponding color temperature unit (not shown for brevity) in the illumination module 10 for controlling the illumination module 10's color temperature. Therefore, when the transistor Q1 is switched on via its control terminal, the corresponding color temperature unit in the illumination module 10 is activated; else, when the transistor Q1 is switch off via its control terminal, the corresponding color temperature unit is disabled as well.

Similarly, the LED control unit 122 includes a transistor Q2, a first resistor R9 and a second resistor R10, and the LED control unit 123 includes a transistor Q3, a first resistor R11 and a second resistor R12. On top of that, the transistor Q2 is electrically coupled to a control terminal LED2 of the illumination module 10, and the transistor Q3 is electrically coupled to a control terminal LED3 of the illumination module 10. Components and combinations of the LED control units 122 and 123 share resemblance as those of the LED control unit 121 and therefore will not be repeatedly described. Also, it is noted that, besides a number of used LED control units is optional in the switch module 12, but each the used LED control units are respectively corresponding to a specific color temperature unit/setting of the illumination module 10 for adjusting a corresponding color temperature.

In one example, the transistors utilized in each the LED control unit of the switch module 12 may be one of a p-type metal-oxide semiconductor field effect transistor (MOSFET) (as shown in FIG. 3), an N-type MOSFET, a npn bipolar junction transistor (BJT), and a pnp BJT, for the purpose of activating or disabling a corresponding color temperature unit of the illumination module 10.

In one example, the sampling module 14 includes an operational amplifier OP that has a negative input terminal electrically coupled to ground. The operational amplifier OP also has a positive input terminal electrically coupled to the driving module 11 (via the node V1). In addition, the operational amplifier OP has an output terminal electrically coupled to the control module 13 and the negative terminal of the operational amplifier OP. In one example, the sampling module 14 further includes a resistor R16 that is electrically coupled between the output terminal of the operational amplifier OP and the negative input terminal of the operational amplifier OP. In one example, the sampling module 14 further includes a resistor R15 that has a first terminal electrically coupled to the negative input terminal and having a second terminal electrically coupled to ground. In one example, the sampling module 14 further includes a resistor R14 that has a first terminal electrically coupled to the positive input terminal of the operational amplifier OP. Besides, the resistor R14 has a second terminal electrically coupled to the driving module 11 (via the node V1). In one example, the sampling module 14 further includes a resistor R13 that has a first terminal electrically coupled to the driving module 11 and has a second terminal electrically coupled to the switch module 12. In one example, the sampling module 14 further includes a resistor R17 that has a first terminal electrically coupled to the output terminal of the operational operator OP. Moreover, the resistor R17 has a second terminal electrically coupled to the control module 13. It is noted the operational operator OP can be implemented using a LM358 amplifier in some examples.

The resistor R13 contributes significantly to the above-mentioned combination mode. Specifically, the resistor R13's cross voltage is kept monitored (via the sampling module 14) by the control module 13 (specifically, a microprocessor of which) so that the illumination module 10's output current can be dynamically monitored as well. In this fashion, if the multiplexing switch S1 switches to conduct different resistors, the current and the voltage cross the resistor R13 also varies correspondingly. And the control module 13 is capable of changing duty cycles of the switch module 12's LED control units (e.g., duty cycles of the nodes G1, G2 and G3) via the resistor R13's cross voltage for adjusting the illumination module 10's luminance and/or color temperature.

In one example, the control module 13 includes a microprocessor unit U1 that has a first input terminal (labeled "P20/ADC5/OSCI") electrically coupled to the signal inputting module 15 for receiving the first voltage signal V1. And the microprocessor unit U1 has a second input terminal (labeled "P05/ADC6/OSCO") electrically coupled to the sampling module 14 for receiving the second voltage signal V2. Additionally, the microprocessor unit U1 has a plurality of control terminals (e.g., the terminals labeled "P17/ADC4/PWM1", "P00/ADC0/PWM2L", and "P01/ADC1/PWM2") electrically and respectively coupled to the plurality of LED control units (e.g., via a corresponding node G1, G2 or G3) for relaying the control signal CT, and more specifically, controlling the duty cycles of the nodes G1, G2 and G3 (i.e., duty cycles of the control units 121, 122, and 123 for example).

In one example, the control module 13 further includes a Zenar diode D1, an electrolytic capacitor C01, a capacitor C1 and a resistor R18. The Zenar diode D1 has a first terminal electrically coupled to a power terminal (labeled "VDD") of the microprocessor unit U1. Second, the Zenar diode D1 has a second terminal electrically coupled to a power source (labeled "VCC"). Third, the Zenar diode D1 has a third terminal electrically coupled to ground. The electrolytic capacitor C01 has a first terminal electrically coupled between the first terminal and the second terminal of the Zenar diode D1. The capacitor C1 is electrically coupled between the first terminal and the third terminal of the Zenar diode D1. The resistor R18 has a first terminal electrically coupled to the third terminal of the Zenar diode D1. Also, the resistor R18 has a second terminal electrically coupled to the power source (labeled "VCC").

In one example, the control module 13 further includes a capacitor C2 that is electrically coupled between a power terminal of the microprocessor unit U1 and a ground terminal of the microprocessor unit U1. In one example, the control module 13 further includes a resistor R19, a first capacitor C3 and a second capacitor C4. The resistor R19 has a first terminal electrically coupled to a power terminal of the microprocessor unit U1. Besides, the resistor R19 has a second terminal electrically coupled to the signal inputting module 15. The first capacitor C3 has a first terminal electrically coupled to the second terminal of the resistor R19. Also, the first capacitor C3 has a second terminal electrically coupled to ground. The second capacitor C4 has a first terminal electrically coupled to ground. In addition, the second capacitor C4 has a second terminal electrically coupled to the microprocessor unit U1 (via a terminal labeled "P05/ADC6/OSCO") and the sampling module 14.

In one example, the driving module 11 includes a rectifying filter unit 111, a controllable silicon driving unit 112 and a strobe removing unit 113. The rectifying filter unit 111 receives power from an external power source (labeled by "L" and "N" as its two terminals) and rectifies the received power. The controllable silicon driving unit 112 is electrically coupled to the rectifying filter unit 111 for receiving the rectified power. Also, the controllable silicon driving unit 112 generates a pre-filtered driving signal based on the color temperature adjusting signal CT. The strobe removing unit 113 is electrically coupled to the controllable silicon driving unit 112, the switch module 12 and the sampling module 14. Besides, the strobe removing unit 113 filters the pre-filtered driving signal to generate the driving signal DR; more specifically, the strobe removing unit 113 can smooth an output current wave of the controllable silicon driving unit 112. Moreover, the strobe removing unit 113 drives the switch module 12 using the driving signal DR.

In one example, the rectifying filter unit 111 includes a rectifying bridge B1, a filter inductor L01, and a first capacitor C10. The rectifying bridge B1 has a first side electrically coupled to the external power source. Moreover, the rectifying bridge B1 has a second side for relaying the rectified power. The filter inductor L01 has a first terminal electrically coupled to the second side of the rectifying bridge. On top of that, the filter inductor L01 has a second terminal electrically coupled to the controllable silicon driving unit 112. The first capacitor C10 has a first terminal electrically coupled to the second terminal of the filter inductor L01. Besides, the first capacitor C10 has a second terminal electrically coupled to a ground terminal of the rectifying bridge B1 and to ground.

In one example, the rectifying filter unit 111 additionally includes a first resistor R26, a second capacitor C8, a third capacitor C9, and a second resistor R27. The first resistor R26 is electrically coupled to the filter inductor L01 in parallel. The second capacitor C8 has a first terminal electrically coupled to the first terminal of the filter inductor L01. And the second capacitor C8 has a second terminal electrically coupled to the second terminal of the first capacitor C10. The third capacitor C9 has a first terminal electrically coupled to the second terminal of the filter inductor L01. The second resistor R27 has a first terminal electrically coupled to a second terminal of the third capacitor C9. Besides, the second resistor R27 has a second terminal electrically coupled to the second terminal of the first capacitor C10. In one example, the rectifying filter unit 111 includes a surge suppressor R01 that is electrically coupled between the external power source and the rectifying bridge. B1

In one example, the controllable silicon driving unit 112 includes a controllable silicon driving chip U2 that has a power terminal (labeled "Vcc") electrically coupled to the illumination module 10 (via the terminal LED+ that connects to the illumination module 10 for driving, and the connection is not illustrated for brevity). Second, the controllable silicon driving chip U2 has a resistor setting terminal (labeled "RT") electrically coupled to ground. Third, the controllable silicon driving chip U2 has a current compensation terminal (labeled "COMP") electrically coupled to ground. Fourth, the controllable silicon driving chip U2 has a voltage feedback terminal (labeled "FB") electrically coupled to the rectifying filter unit 111 and the strobe removing unit 113. Fifth, the controllable silicon driving chip U2 has a current sensing terminal (labeled "CS") electrically coupled to ground. Sixth, the controllable silicon driving chip U2 has an output terminal (labeled "Drain") electrically coupled to the strobe removing unit 113. And the controllable silicon driving chip U2 has a ground terminal (labeled "GND") electrically coupled to ground.

In one example, the controllable silicon driving unit U2 further includes a first resistor R22, a first capacitor C5, a second resistor R23, a second capacitor C6, a third resistor R25 and a first diode D03. The first resistor R22 is electrically coupled between the power terminal of the controllable silicon driving chip U2 and the illumination module 10. The first capacitor C5 is electrically coupled between the power terminal of the controllable silicon driving chip U2 and ground. The second resistor R23 is electrically coupled between the resistor setting terminal of the controllable silicon driving chip U2 and ground. The second capacitor C6 is electrically coupled between the current compensation terminal of the controllable silicon driving chip U2 and ground. The third resistor R25 has a first terminal electrically coupled to the voltage feedback terminal of the controllable silicon driving chip U2. Besides, the third resistor R25 has a second terminal electrically coupled to the strobe removing unit 113 and the rectifying unit filter unit 111. The first diode D03 has a positive terminal electrically coupled to the output terminal of the controllable silicon driving chip U2. In addition, the first diode D03 has a negative terminal electrically coupled to the second terminal of the third resistor R25.

In one example, the controllable silicon driving unit U2 further includes a transformer secondary winding L1, a second diode D02, a third capacitor C7, a Zenar diode D4 and an electrolytic capacitor C03. The transformer secondary winding L1 has a first terminal electrically coupled to the rectifying filter unit 111 and the strobe removing unit 113. Also, the transformer secondary winding L1 has a second terminal electrically coupled to the output terminal of the controllable silicon driving unit U2. The second diode D02 has a positive terminal electrically coupled to a third terminal of the transformer secondary winding L1. Besides, the second diode D02 has a negative terminal electrically coupled to a secondary power source (labeled "VCC"). The third capacitor C7 has a first terminal electrically coupled to the negative terminal of the second diode D02. Moreover, the third capacitor C7 has a second terminal electrically coupled to the rectifying filter unit 111 and the strobe removing unit 113. The Zenar diode D4 has a positive terminal electrically coupled to the second terminal of the third capacitor C7. And the Zenar diode D4 has a negative terminal electrically coupled to the negative terminal of the first diode D02. The electrolytic capacitor C03 is electrically coupled to the Zenar diode D4 in parallel.

In one example, the strobe removing unit 113 includes a transistor Q4, a first resistor R20, a first Zenar diode D3, an electrolytic capacitor C02, a second Zenar diode D2, a diode D01 and a second resistor R21. It is noted that the transistor Q4 can be implemented using a P-type MOSFET, an N-type MOSFET, a pnp BJT, or a npn BJT in examples of the present disclosure. The transistor Q4 has a first terminal electrically coupled to illumination module 10 (via the terminal LED+). The first resistor R20 has a first terminal electrically coupled to a second terminal of the transistor Q4. The first Zenar diode D3 has a positive terminal electrically coupled to the first terminal of the transistor Q4, and has a negative terminal electrically coupled to the second terminal of the transistor Q4. The electrolytic capacitor C02 has a first terminal electrically coupled to the controllable silicon driving unit 112 and the switch module 12. In addition, the electrolytic capacitor C02 has a second terminal electrically coupled to a second terminal of the first resistor R20. The second Zenar diode D2 has a positive terminal electrically coupled to the second terminal of the first resistor R20. The diode D01 has a positive terminal electrically coupled to a third terminal of the transistor Q4 and the controllable silicon driving unit 112. And the diode D01 has a negative terminal electrically coupled to a negative terminal of the second Zenar diode D2. The second resistor R21 is electrically coupled to the diode D01 in parallel.

In one example, the control terminal LED1 of the illumination module 10 may correspond to a light source that has a color temperature of 50K; the control terminal LED2 of the illumination module 10 may correspond to a light source that has a color temperature of 27K; and the control terminal LED3 of the illumination module 10 may correspond to a light source that has a color temperature of 20K. When the resistor R13's cross voltage is too low to be recognized by the microprocessor unit U1, the microprocessor unit U1 is required to raise the resistor R13's cross voltage for normal processing. That is, assume that the controllable silicon chip U2's output current is between 0 mA and 100 mA that corresponds to a duty cycle between 0%-100%. If the resistor R13's cross voltage that is sampled by the microprocessor unit U1 (via the sampling module 14) is between 1.44 volts and 1.6 volts, the microprocessor unit U1 in turn activates the control terminal G1, the LED control unit 121, and the control terminal LED1 of the illumination module 10 for achieving a color temperature of 50K. If the resistor R13's cross voltage that is sampled by the microprocessor unit U1 (via the sampling module 14) is between 1.344 volts and 1.44 volts, the microprocessor unit U1 in turn activates the control terminal G2, the LED control unit 122, and the control terminal LED2 of the illumination module 10 for achieving a color temperature of 30K. And if the resistor R13's cross voltage that is sampled by the microprocessor unit U1 (via the sampling module 14) is between 0 volts and 1.344 volts, the microprocessor unit U1 in turn activates the control terminal G3, the LED control unit 123, and the control terminal LED3 of the illumination module 10 for achieving a gradual color temperature of 20K-30K (e.g., the abovementioned combination mode). In this way, the illumination system 100 of the present disclosure overcomes the conventional silicon dimmer circuit's limit in dynamic adjustments of illuminance and/or color temperature.

The invention claimed is:

1. A light emitting diode (LED) illumination system, comprising:
    a signal inputting module, configured to receive a selection signal that corresponds to one specific color temperature, and configured to generate a first voltage signal based on the selection signal;
    a driving module, configured to generate a driving signal based on a color temperature adjusting signal;
    a switch module, electrically coupled to the driving module for receiving the driving signal, wherein the switch module comprises a plurality of LED control units that are electrically coupled to each other in parallel;
    an illumination module, electrically coupled to the plurality of LED control units of the switch module, and configured to illuminate in response to an activation status of the plurality of LED control units;
    a sampling module, electrically coupled to the driving module, electrically coupled to the switch module for sampling the output current of the switch module, and configured to generate a second voltage signal based on the sampled output current; and
    a control module, electrically coupled to the signal inputting module for receiving the first voltage signal, electrically coupled to the sampling module for receiving the second voltage signal, configured to generate a control signal based on the first voltage signal and the second voltage signal, and electrically coupled to the switch module for relaying the control signal;
    wherein the switch module is further configured to control its illumination status based on the driving signal and the control signal.

2. The LED illumination system of claim 1, wherein the signal inputting module comprises:
    a multiplexing switch; and
    a plurality of resistors respectively electrically coupled to the multiplexing switch;
    wherein the multiplexing switch is configured to conduct one of the plurality of resistors based on the color temperature selection signal for generating the first voltage signal.

3. The LED illumination system of claim 1, wherein each of the plurality of LED control units comprises:
    a transistor, having a first terminal electrically coupled to a corresponding control terminal of the control module for receiving the control signal, having a second terminal electrically coupled to the driving module for receiving the driving signal, and having a third terminal electrically coupled to a control terminal of the illumination module for controlling the illumination of the illumination module;
    a first resistor, having a first terminal electrically coupled to the first terminal of the transistor, and having a second terminal electrically coupled to the second terminal of the transistor; and
    a second resistor, having a first terminal electrically coupled to the first terminal of the transistor, and having a second terminal electrically coupled to a LED driving terminal of the illumination module for driving the illumination module.

4. The LED illumination system of claim 3, wherein the transistor is selected from a group consisting of a p-type metal-oxide semiconductor field effect transistor (MOSFET), an N-type MOSFET, a npn bipolar junction transistor (BJT), and a pnp BJT.

5. The LED illumination system of claim 1, wherein the sampling module comprises:
    an operational amplifier, having a negative input terminal electrically coupled to ground, having a positive input terminal electrically coupled to the driving module, and having an output terminal electrically coupled to the control module and the negative terminal of the operational amplifier.

6. The LED illumination system of claim 5, wherein the sampling module further comprises:
    a resistor, electrically coupled between the output terminal of the operational amplifier and the negative input terminal of the operational amplifier.

7. The LED illumination system of claim 5, wherein the sampling module further comprises:
    a resistor, having a first terminal electrically coupled to the negative input terminal and having a second terminal electrically coupled to ground.

8. The LED illumination system of claim 5, wherein the sampling module further comprises:
    a resistor, having a first terminal electrically coupled to the positive input terminal of the operational amplifier and having a second terminal electrically coupled to the driving module.

9. The LED illumination system of claim 5, wherein the sampling module further comprises:
    a resistor, having a first terminal electrically coupled to the driving module and having a second terminal electrically coupled to the switch module.

10. The LED illumination system of claim 5, wherein the sampling module further comprises:
   a resistor, having a first terminal electrically coupled to the output terminal of the operational amplifier, and having a second terminal electrically coupled to the control module.

11. The LED illumination system of claim 1, wherein the control module comprises:
   a microprocessor unit, having a first input terminal electrically coupled to the signal inputting module for receiving the first voltage signal, having a second input terminal electrically coupled to the sampling module for receiving the second voltage signal, and having a plurality of control terminals electrically and respectively coupled to the plurality of LED control units for relaying the control signal.

12. The LED illumination system of claim 11, wherein the control module further comprises:
   a Zener diode, having a first terminal electrically coupled to a power terminal of the microprocessor unit, having a second terminal electrically coupled to a power source, and having a third terminal electrically coupled to ground;
   an electrolytic capacitor, having a first terminal electrically coupled between the first terminal and the second terminal of the Zener diode;
   a capacitor, electrically coupled between the first terminal and the third terminal of the Zener diode; and
   a resistor, having a first terminal electrically coupled to the third terminal of the Zener diode, and having a second terminal electrically coupled to the power source.

13. The LED illumination system of claim 11, wherein the control module further comprises:
   a capacitor, electrically coupled between a power terminal of the microprocessor unit and a ground terminal of the microprocessor unit.

14. The LED illumination system of claim 11, wherein the control module further comprises:
   a resistor, having a first terminal electrically coupled to a power terminal of the microprocessor unit, and having a second terminal electrically coupled to the signal inputting module;
   a first capacitor, having a first terminal electrically coupled to the second terminal of the resistor, and having a second terminal electrically coupled to ground; and
   a second capacitor, having a first terminal electrically coupled to ground, and having a second terminal electrically coupled to the microprocessor unit and the sampling module.

15. The LED illumination system of claim 1, wherein the driving module comprises:
   a rectifying filter unit, configured to receive power from an external power source and to rectify the received power;
   a controllable silicon driving unit, electrically coupled to the rectifying filter unit for receiving the rectified power, and configured to generate a pre-filtered driving signal based on the color temperature adjusting signal; and
   a strobe removing unit, electrically coupled to the controllable silicon driving unit, the switch module, and the sampling module, configured to filter the pre-filtered driving signal to generate the driving signal, and configured to drive the switch module using the driving signal.

16. The LED illumination system of claim 15, wherein the rectifying filter unit comprises:
   a rectifying bridge, having a first side electrically coupled to the external power source, and having a second side for relaying the rectified power;
   a filter inductor, having a first terminal electrically coupled to the second side of the rectifying bridge, and having a second terminal electrically coupled to the controllable silicon driving unit; and
   a first capacitor, having a first terminal electrically coupled to the second terminal of the filter inductor, and having a second terminal electrically coupled to a ground terminal of the rectifying bridge and to ground;
   a first resistor, electrically coupled to the filter inductor in parallel;
   a second capacitor, having a first terminal electrically coupled to the first terminal of the filter inductor, and having a second terminal electrically coupled to the second terminal of the first capacitor;
   a third capacitor, having a first terminal electrically coupled to the second terminal of the filter inductor; and
   a second resistor, having a first terminal electrically coupled to a second terminal of the third capacitor, and having a second terminal electrically coupled to the second terminal of the first capacitor.

17. The LED illumination system of claim 15, wherein the rectifying filter unit comprises:
   a surge suppressor, electrically coupled between the external power source and the rectifying bridge.

18. The LED illumination system of claim 15, wherein the controllable silicon driving unit comprises:
   a controllable silicon driving chip, having a power terminal electrically coupled to the illumination module, having a resistor setting terminal electrically coupled to ground, having a current compensation terminal electrically coupled to ground, having a voltage feedback terminal electrically coupled to the rectifying filter unit and the strobe removing unit, having a current sensing terminal electrically coupled to ground, having an output terminal electrically coupled to the strobe removing unit, and having a ground terminal electrically coupled to ground.

19. The LED illumination system of claim 18, wherein the controllable silicon driving unit further comprises:
   a first resistor, electrically coupled between the power terminal of the controllable silicon driving chip and the illumination module;
   a first capacitor, electrically coupled between the power terminal of the controllable silicon driving chip and ground;
   a second resistor, electrically coupled between the resistor setting terminal of the controllable silicon driving chip and ground;
   a second capacitor, electrically coupled between the current compensation terminal of the controllable silicon driving chip and ground;
   a third resistor, having a first terminal electrically coupled to the voltage feedback terminal of the controllable silicon driving chip, and having a second terminal electrically coupled to the strobe removing unit; and
   a first diode, having a positive terminal electrically coupled to the output terminal of the controllable silicon driving chip, and having a negative terminal electrically coupled to the second terminal of the third resistor.

20. The LED illumination system of claim 19, wherein the controllable silicon driving unit further comprises:
- a transformer secondary winding, having a first terminal electrically coupled to the rectifying filter unit and the strobe removing unit, and having a second terminal electrically coupled to the output terminal of the controllable silicon driving unit;
- a second diode, having a positive terminal electrically coupled to a third terminal of the transformer secondary winding, and having a negative terminal electrically coupled to a secondary power source;
- a third capacitor, having a first terminal electrically coupled to the negative terminal of the second diode, and having a second terminal electrically coupled to the rectifying filter unit and the strobe removing unit;
- a Zener diode, having a positive terminal electrically coupled to the second terminal of the third capacitor, and having a negative terminal electrically coupled to the negative terminal of the first diode; and
- an electrolytic capacitor, electrically coupled to the Zener diode in parallel.

* * * * *